US007580208B2

(12) United States Patent  (10) Patent No.: US 7,580,208 B2
Nakahara  (45) Date of Patent: Aug. 25, 2009

(54) FOCUS ADJUSTMENT APPARATUS (75) Inventor: Naoto Nakahara, Saitama (JP)

(73) Assignee: Hoya Corporation, Tokyo (JP)

( * ) Notice: Subject to any disclaimer, the term of this patent is extended or adjusted under 35 U.S.C. 154(b) by 254 days.

(21) Appl. No.: 11/564,468

(22) Filed: Nov. 29, 2006

(65) Prior Publication Data
US 2007/0127138 A1 Jun. 7, 2007

(30) Foreign Application Priority Data
Dec. 1, 2005 (JP) ............................ P2005-348366

(51) Int. Cl.
G02B 7/02 (2006.01)
(52) U.S. Cl. ...................... 359/824; 359/811
(58) Field of Classification Search .................. 359/824
See application file for complete search history.

(56) References Cited

U.S. PATENT DOCUMENTS

2005/0219719 A1* 10/2005 Kawai ........................ 359/819
2005/0280734 A1 12/2005 Nakahara
2005/0280735 A1 12/2005 Nakahara
2006/0077280 A1 4/2006 Nakahara
2006/0078323 A1 4/2006 Nakahara

FOREIGN PATENT DOCUMENTS

JP 11-298791 10/1999
JP 2000-89089 3/2000
JP 2001-154083 6/2001

OTHER PUBLICATIONS

English language Abstract of JP 11-298791.
English language Abstract of JP 2000-89089.
English language Abstract of JP 2001-154083.
U.S. Appl. No. 11/609,518 to Nakahara, which was filed Dec. 12, 2006.

* cited by examiner

Primary Examiner—Jordan M. Schwartz
Assistant Examiner—James C Jones
(74) Attorney, Agent, or Firm—Greenblum & Bernstein, P.L.C.

(57) ABSTRACT

A focus adjustment apparatus includes an imaging device for capturing object images via a photographing lens; a lens driving device which moves a focusing lens group; a manual focus adjustment device which actuates the lens driving device to move the focusing lens group in response to a manual operation; a focus detection device for making the imaging device capture an object image to determine a contrast value thereof each time the focusing lens group moves by a predetermined amount of movement due to the manual operation, and for detecting an in-focus position of the focusing lens group in accordance with contrast values detected by the focus detection device at different lens positions; and a controller which moves the focusing lens group to the in-focus position via the lens driving device if a deviation exists between a stopped position and the in-focus position.

13 Claims, 6 Drawing Sheets

FOCUS ADJUSTMENT APPARATUS

BACKGROUND OF THE INVENTION

1. Field of the Invention

The present invention relates to a focus adjustment apparatus which includes a manual focus system and an autofocus system.

2. Description of the Prior Art

Compact digital cameras which include both a manual focus capability (manual focus system) for manually adjusting the focus by a photographer and a contrast detection autofocus capability (autofocus system) for automatically detecting a focus in accordance with contrasts of an object image are known in the art. In typical compact digital cameras, object images are captured at predetermined intervals and are indicated on an LCD panel. The manual focus system incorporated in such compact digital cameras is constructed so that a motor starts rotating upon a focus control switch being operated to move a focusing lens group in a direction toward a position thereof on the close-distance range side or the long-distance side by the rotation of the motor. In the case of performing a manual focus adjustment with such a manual focus system, the photographer operates the focus control switch while viewing an image indicated on the LCD panel. However, since conventional LCD panels are small in display size and also in number of pixels as compared with the number of pixels for photography (i.e., the number of pixels contained in an image pickup device such as a CCD image sensor), it is difficult for the photographer (user) to determine whether or not focus is achieved by the unaided eye while viewing an image indicated on the LCD panel.

A digital camera which has the capability of magnifying (zooming) an image indicated on a portion of the display area of the LCD panel has been developed (refer to Japanese Laid-Open Patent Publication (Kokai) HEI 11-298791). If such a zoom display operation is performed during operation of a manual focus adjustment, it becomes easy to visually determine whether or not focus has been achieved.

However, it is often the case that the focus of the focusing lens group overruns an intended stopping position even if the photographer releases the hand from the focus operation switch at the intended moment, and accordingly, it is difficult to bring the focus to a point intended by the photographer. Namely, it is difficult for the photographer to adjust the focus to a target point where the photographer visually determines that focus has been achieved.

SUMMARY OF THE INVENTION

The present invention has been devised in view of the above described problems in the conventional focus adjustment apparatus, and provides a focus adjustment apparatus which makes it possible to ultimately bring an object into sharp focus in a manual focus operation.

According to an aspect of the present invention, a focus adjustment apparatus is provided, including an imaging device for capturing object images via a photographing lens; a lens driving device which moves a focusing lens group included in the photographing lens along an optical axis thereof; a manual focus adjustment device which actuates the lens driving device to move the focusing lens group in response to a manual operation; a focus detection device for making the imaging device capture an object image to determine a contrast value thereof each time the focusing lens group moves along the optical axis by a predetermined amount of movement while the focusing lens group is moved via the lens driving device due to the manual operation, and for detecting an in-focus position of the focusing lens group in accordance with contrast values detected by the focus detection device at different lens positions on the optical axis of the focusing lens group; and a controller which moves the focusing lens group to the in-focus position via the lens driving device if a deviation exists between a stopped position of the focusing lens group and the in-focus position when the focusing lens group stops moving in response to a release of the manual operation.

It is desirable for the controller not to move the focusing lens group if a deviation does not exist within a predetermined range between a stopped position of the focusing lens group and the in-focus position.

It is desirable for the controller not to move the focusing lens group if a deviation exists within a predetermined range between a stopped position of the focusing lens group and the in-focus position.

It is desirable for the focus detection device to detect a peak contrast value from among contrast values obtained at consecutive the lens positions of the focusing lens group in a same direction of movement thereof to determine that a lens position of the focusing lens group, at which the peak contrast value is obtained, corresponds to the in-focus position of the focusing lens group.

It is desirable for the focus adjustment apparatus to include a display device which indicates a current lens position of the focusing lens group in the optical axis direction and the in-focus position that is detected by the focus detection device.

It is desirable for the display device to indicate the current lens position and the in-focus position only when the in-focus position is positioned within a predetermined range from the current position.

It is desirable for the lens driving device to drive the focusing lens group stepwise in steps of a predetermined amount of movement when the manual focus adjustment device actuates the lens driving device to move the focusing lens group in response to the manual operation.

It is desirable for the peak contrast value that is detected by the focus detection device to be designated as a peak contrast value which consecutively increases a plurality of times and thereafter consecutively decreases a plurality of times along the direction of movement of the focusing lens group.

It is desirable for the contrast values to be measured via the imaging device.

It is desirable for the lens driving device to include a lens drive mechanism and a motor for moving the focusing lens group via the lens drive mechanism.

The motor can be a stepping motor.

It is desirable for the focus adjustment apparatus to be incorporated in a digital camera.

In an embodiment, a focus adjustment apparatus is provided, including a lens driving device which moves a focusing lens group included in the photographing lens along an optical axis thereof; a manual focus adjustment device which actuates the lens driving device to move the focusing lens group in response to a manual operation; a focus detection device which detects an in-focus position with respect to an object when the focusing lens group is stopped; and a controller which moves the focusing lens group to the in-focus position via the lens driving device if a deviation exists between a stopped position of the focusing lens group and the in-focus position when the focusing lens group stops moving in response to a release of the manual operation.

According to the present invention, the photographer can bring a target object into sharp focus since a focus state is detected concurrently while the focusing lens group is moving when a focus adjustment operation is manually performed, and also since the focusing lens group is moved to an in-focus position if a deviation exists between a stopped position of the focusing lens group and the in-focus position.

The present disclosure relates to subject matter contained in Japanese Patent Application No. 2005-348366 (filed on Dec. 1, 2005), which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 1:
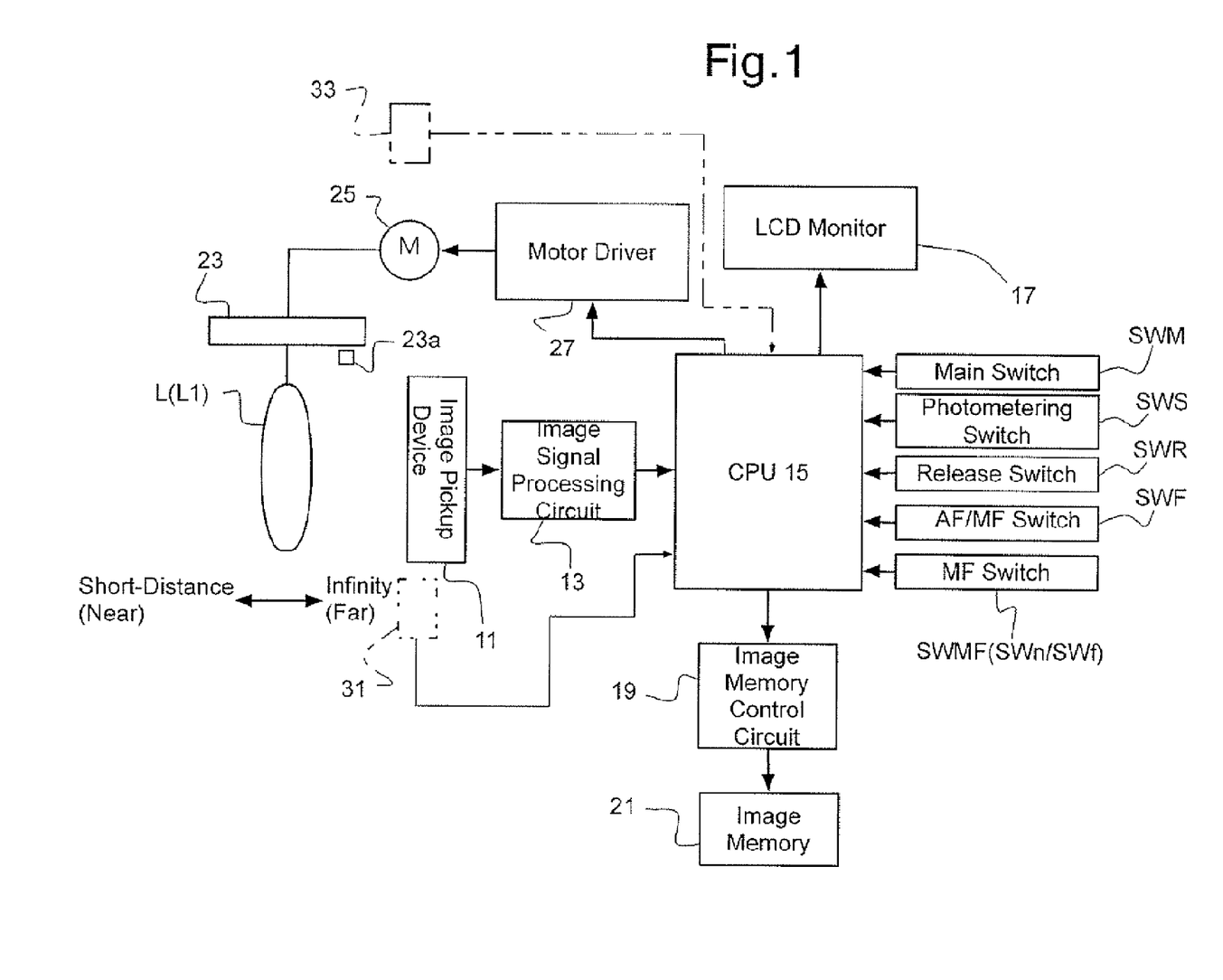
FIG. 1 is a block diagram of elements of an embodiment of a digital camera to which the present invention is applied, showing a basic configuration of the digital camera.

FIG. 1 is a block diagram of essential elements of an embodiment of a compact digital camera to which a focus adjustment apparatus of the present invention is applied. This compact digital camera is provided with a photographing lens L including a focusing lens group (movable lens group) L1, and an image pickup device (CCD image sensor) 11 serving as an imaging device. An object image is formed on a light receiving surface 12 (see FIG. 2) of the image pickup device 11 via the photographing lens L. The focusing lens group L1 is supported to be freely movable between the infinite focus position (far side/position for bringing an object at infinity into focus) and the closest (shortest) focus position (near side/position for bringing an object at the shortest distance in working range into focus) and is driven stepwise by an AF motor 25 under control of a motor driver 27. The motor driver 27 operates on a command from a CPU (controller/focus detection device) 15 when the digital camera is in an AF (autofocus) mode, and operates on a command which is output from the CPU 15 in response to an operation of an MF (manual focus) switch (manual focus adjustment device) SWMF when the digital camera is in an MF mode.

The image pickup device 11 includes a large number of pixels (photoelectric transducing elements/photo diodes) arranged in a two-dimensional matrix at predetermined intervals. The digital camera is further provided with an image signal processing circuit 13, an LCD monitor (display device) 17, an image memory control circuit 19, an image memory 21 and a lens drive mechanism 23. Each pixel of the image pickup device 11 converts the incident light of an object image thereon into an electrical charge, and the electrical charges is accumulated (integrated). Upon completion of an exposure, the accumulated charges are output, pixel by pixel, as an image signal to the image signal processing circuit 13. The image signal processing circuit 13 performs predetermined adjusting processes such as a white-balance adjusting process and an A/D converting process on the input image signal to output digital image data to the CPU 15. Namely, predetermined processes are performed on the input image signal in the image signal processing circuit 13, and the image data which is digitized into pixel data is output to the CPU 15. The CPU 15 converts the input image data into an image signal capable of being indicated on the LCD monitor 17 to visually indicate the image data on the LCD monitor 17 in a through mode (monitoring mode), and converts the input image data into image data having a predetermined format to write this image data into the image memory 21 via the image memory control circuit 19.

The lens drive mechanism 23, the AF motor 25 and the motor driver 27 constitute a lens driving device for moving the focusing lens group L1 along the optical axis thereof.

The digital camera includes two focus adjustment modes available: the aforementioned AF mode (contrast-detection type AF mode/contrast AF mode) and the aforementioned MF mode.

In the AF mode, a focus is detected by a contrast detecting method. Specifically, in the AF mode, an image capturing operation is performed on the image pickup device 11 while the focusing lens group L1 is driven stepwise in steps by a predetermined amount of movement, a detecting operation for detecting a contrast of image data and a storing operation for storing the contrast value are repeated to detect a peak contrast value in the direction of movement of the focusing lens group L1, and an in-focus position of the focusing lens group L1 is detected in the contrast AF mode, in which a position of the focusing lens group L1 at which the peak contrast value is obtained. The focusing lens group L1 is moved to the in-focus position thus detected.

It is sometimes the case that an actual in-focus position of the focusing lens group L1 slightly deviates from a position thereof at which a peak contrast value is obtained because the focusing lens group L1 is driven stepwise. Additionally, it is sometimes the case that a predetermined amount of movement of the focusing lens group L1 which is driven stepwise in the AF mode is larger than a minimum driving amount of the focusing lens group L1 which can be driven stepwise by the AF motor 25. Accordingly, a position of the focusing lens group L1 at which an actual peak contrast value is obtained by an approximate calculation based on obtained contrast values can be determined, to set the lens position thus obtained or a stopped position of the focusing lens group L1, which is closest to this lens position, as an in-focus position.

In the MF mode, the focusing lens group L1 is moved to the near side (short focal-distance side) or the far side (long focal-distance side) by driving the AF motor 25 stepwise to the near side or the far side by the motor driver in accordance with the operating direction of the MF switch SWMF upon the MF switch SWMF being operated, and is stopped upon the MF switch SWMF being released. The MF switch SWMF is provided with a near direction switch SWn for moving the focusing lens group L1 in the direction toward the near side and a far direction switch SWf for moving the focusing lens group L1 in the direction toward the far side. The MF mode and the AF mode are selectable by an operation of an AF/MF switch SWF.

Additionally, in the MF mode that is selectable in the digital camera of the present invention, a process, similar to that performed in the AF mode, is performed in which an image capturing operation is performed on the image pickup device 11 while the focusing lens group L1 is driven stepwise and a storing operation for storing a contrast value of the captured image are repeated to detect a peak contrast value. Thereafter, if the stopped position of the focusing lens group L1 is not coincident with an in-focus position detected in the AF mode, the focusing lens group L1 is moved to this in-focus position detected in the AF mode.

Figure 2:
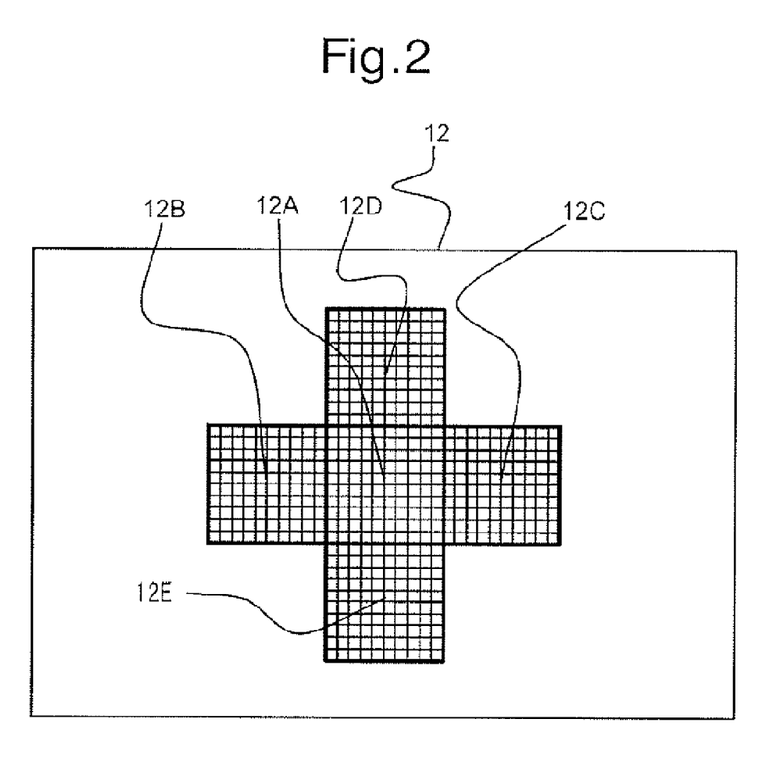
FIG. 2 is a diagrammatic illustration showing the relative position between a light receiving surface of an image pickup device and five focus detection areas on the light receiving surface in the digital camera shown in FIG. 1.
Figure 3:
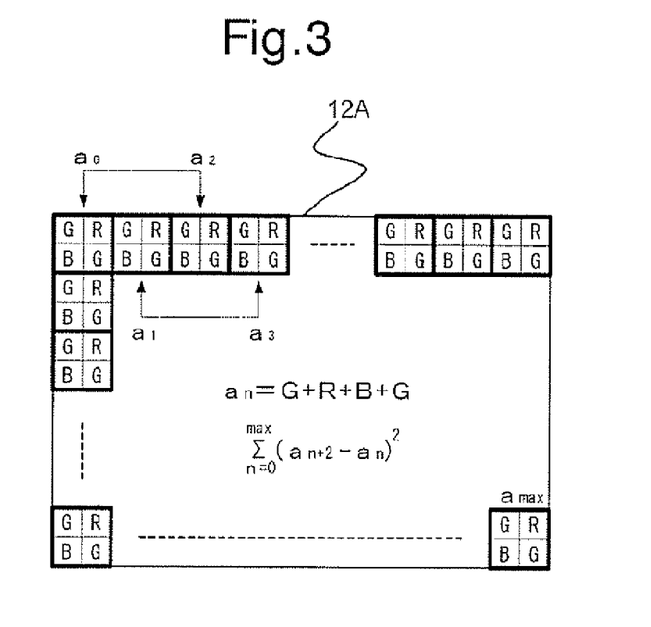
FIG. 3 is a diagrammatic illustration showing the arrangement of primary-color filters of the image pickup device.

FIG. 2 shows the relative position between the light receiving surface 12 of the image pickup device 11 and five focus detection areas: first through fifth focus detection areas 12A, 12B, 12C, 12D and 12E, arranged on the light receiving surface 12 in the shape of a cross, by way of example. FIG. 3 is an enlarged view of the first (central) focus detection area 12A. Each of the remaining four focus detection areas 12B through 12E has the same structure as the first focus detection area 12A, and accordingly, only the first focus detection area 12A is shown in FIG. 3. The first focus detection area 12A is positioned at substantially the center of the light receiving surface 12, the second and third focus detection areas 12B and 12C are positioned on laterally opposite sides of the first focus detection area 12A, and the fourth and fifth focus detection areas 12D and 12E are positioned on vertically opposite sides of the first focus detection area 12A. Primary-color filters (red (R), green (G) and blue (B) filters) are disposed in front of each pixel (photoelectric transducing element) on the object side thereof, and each pixel on the light receiving surface 12 transduces the red, green and blue components of the incident rays of object light that are passed through the primary-color filters into electrical charges, and these electrical charges are accumulated. The electrical charges thus accumulated for a predetermined period of time are read out of the image pickup device 11 pixel by pixel to be output as an image signal.

FIG. 3 shows a typical arrangement (Bayer array) of primary-color filters. In the contrast AF mode in the illustrated embodiment of the digital camera, four pixels (a 2 by 2 matrix of pixels) in each square, namely, a combination of two green filters, a red filter and a blue filter is treated as one pixel block, and the sum of the magnitudes of image signals integrated by the four pixels in each pixel block is regarded as intensity $a_n$ ($a_n$=G+R+B+G).

Accordingly, an operation for determining the difference between the intensity $a_n$ of a pixel block and the intensity $a_n$ of another pixel block positioned one pixel-block away from the previous pixel block in the horizontal direction is repeated successively in the horizontally rightward direction within the first focus detection area 12A while the differences thus determined ($a_{n+2}-a_n$) are added up. Upon completion of the difference determining and adding operations on the pixel block at the right end of the first focus detection area 12A in the horizontal direction, the difference determining and adding operations are repeated on a subsequent row of pixel blocks one pixel block below the previous row of pixel blocks until completion of the determining operation on the pixel block at the right end of the first focus detection area 12A in the horizontal direction and completion of the adding operation thereof. Such difference determining and adding operations are repeated on all the pixel blocks in the first focus detection area 12A. Subsequently, the same operations are performed on each of the remaining four focus detection areas 12B through 12E.

The sum of the differences ($a_{n+2}-a_n$) on each of the first through fifth focus detection areas 12A through 12E corresponds to the contrast value on the focus detection area at the current position of the focusing lens group L1. The contrast value can be represented by the following expression 1:

$$\sum_{n=0}^{max}(a_{n+2}-a_n)^2 \qquad \text{[Expression 1]}$$

Note that the contrast value is determined using the first focus detection area 12A in the embodiment which will be discussed below.

In a contrast AF process performed in each of the AF mode and the MF mode, the CPU 15 performs an image capturing operation on the image pickup device 11 while moving the focusing lens group L1 stepwise via the motor driver 27, the AF motor 25 and the lens drive mechanism 23; inputs the image signals from the first through fifth focus detection areas 12A through 12E to determine the contrast values on the first through fifth focus detection areas 12A through 12E, respectively; and stores the determined contrast values in an internal RAM of the CPU 15 as contrast data. The CPU 15 repeats the contrast AF process while moving the focusing lens group L1 stepwise in steps of a predetermined amount of movement from the far side to the near side (from one movable end toward the other movable end of the focusing lens group L1).

In the present embodiment of the digital camera, the position of the focusing lens group L1 is detected by an origin sensor 23a with the far side of the focusing lens group L1 being regarded as a point of origin, and is counted as the number of drive pulses from the point of origin. The drive pulses are defined as, e.g., pulses output from an encoder such as a photo-interrupter installed on the output shaft of the AF motor 25. Although several hundreds of pulses or more are usually necessary for driving the focusing lens group L1 from the far side to the near side, it is assumed that several pulses or several dozen pulses are only necessary for driving the focusing lens group L1 in a stepwise manner from the far side to the near side in the contrast AF process in the present embodiment of the digital camera for the purpose of simplifying the description. In addition, in the drive pulses used in the contrast AF process in the present embodiment of the digital camera, it is assumed that one drive/position pulse constitutes more than one pulse output from the aforementioned photo-interrupter in the contrast AF process in the present embodiment of the digital camera.

Immediately after contrast values at the plurality of lens positions from the far side to the near side are obtained, contrast values at two adjacent lens positions of the focusing lens group L1 are compared with each other successively at consecutive lens positions in a direction of movement of the focusing lens group L1, e.g., in a direction from a position of the focusing lens group L1 on the near side to a position of the focusing lens group L1 on the far side, to determine whether or not the contrast value increases successively a predetermined number of times and subsequently decreases successively a predetermined number of times, i.e., to determine whether or not there is a peak contrast value.

In the present embodiment of the digital camera, it is determined whether or not the contrast value increases two times consecutively, and subsequently decreases two times consecutively based on a group of obtained contrast values at consecutive five lens positions in the direction from the far side toward the near side (or from the near side toward the far side) of the focusing lens group L1, i.e., whether or not the contrast value of the middle (third) lens position of the five lens positions is a peak contrast value. The same determining operation is repeated on another group of five contrast values at consecutive five lens positions which are shifted one by one toward either the near side or the far side with respect to the previous five lens positions.

Additionally, in the present embodiment of the digital camera, if it is determined that the contrast value of the middle lens position of the five lens positions is a peak contrast value, it is determined whether or not the reliability of this peak contrast value is high. The contrast value of the middle lens position of the five lens positions is stored in memory as a peak contrast value only when it is determined that the reliability of this peak contrast value is high.

Operations of the present embodiment of the digital camera will be discussed with reference to the flow charts shown in FIGS. 4A through 6, and a relationship between the position of the focusing lens group L1 and contrast values shown in FIGS. 7A through 7D.

Figure 4:
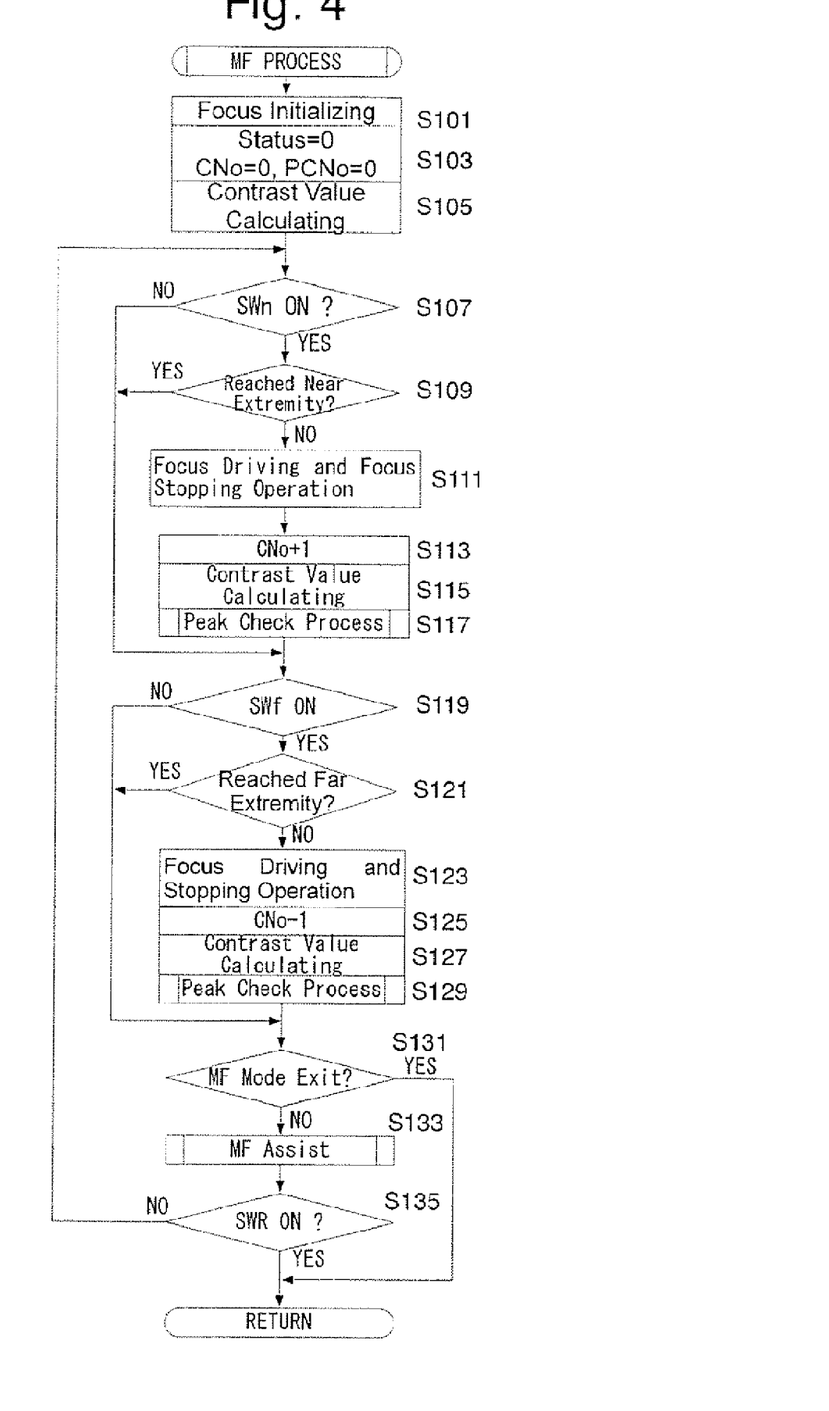
FIG. 4 shows a flow chart showing an MF process performed in the digital camera shown in FIG. 1.

An MF process that is performed in the MF mode in the present embodiment of the digital camera will be discussed in detail with reference to the flow chart shown in FIG. 4. This MF process is performed by the CPU 15 upon a main switch SWM (see FIG. 1) being turned ON when the MF mode is selected by the AF/MF switch SWF.

In the MF process, firstly a focus initializing process is performed (step S101). In this focus initializing process, the AF motor 25 is driven to move the focusing lens group L1 to the far side. Whether or not the focusing lens group L1 is positioned at the far side is detected by the origin sensor 23a.

Subsequently, a peak status flag STATUS, a current position CNo and a peak position PCNo are cleared (set to 0) (step S103). The peak status flag STATUS is a flag for identifying the presence of an in-focus state; the peak status flag STATUS is set to "1" if the photographing lens L is in an in-focus state. The current position CNo is a counter for counting drive pulses when the focusing lens group L1 is moved in the direction from the far side to the near side; the far side of the focusing lens group L1 corresponds to the counter value 0 (zero) of the current position CNo. The counter value of the current position CNo which corresponds to the position of the focusing lens group L1 when a peak contrast value is detected is assigned to the peak position PCNo.

Subsequently, a contrast value calculating process when the focusing lens group L1 is positioned at the far side is performed (step S105).

The contrast value Cnt[CNo] of each lens position (the current position CNo) of the focusing lens group L1 is determined by the following expression 2:

$$Cnt[CNo] = \sum_{n=0}^{max} (a_{n+2} - a_n)^2 \quad \text{[Expression 2]}$$

Subsequently, it is determined whether the near direction switch SWn is ON or whether the far direction switch SWf is ON, and operations according to the near/far direction switch SWn or SWf which is in the ON position are performed.

It is determined whether or not the near direction switch SWn is ON (step S107). If the near direction switch SWn is ON (if YES at step S107), it is determined whether or not the focusing lens group L1 has reached the near extremity (step S109). If the focusing lens group L1 has not reached the near extremity (if NO at step S109), a focus driving operation and a focus-drive stopping operation are performed; namely, the AF motor 25 is driven in a direction to move the focusing lens group L1 toward the near side by the number of the drive pulses n (one drive pulse), and is thereupon stopped (step S111). Thereafter, the counter value of the current position CNo is increased by one (step S113), the contrast value calculating process is performed based on image data captured by the image pickup device 11 (step S115), a peak check process (see FIG. 5) is performed (step S117), and control proceeds to step S119. If the near direction switch SWn is not ON (if NO at step S107), or if the focusing lens group L1 has reached the near extremity (if YES at step S109), control skips the driving process which consists of the operations at steps S111 through S117 and directly proceeds to step S119.

At step S119 it is determined whether or not the far direction switch SWf is ON. If the far direction switch SWf is ON (if YES at step S119), it is determined whether or not the focusing lens group L1 has reached the far extremity (step S121). If the focusing lens group L1 has not reached the far extremity (if NO at step S121), a focus driving operation and a focus-drive stopping operation are performed; namely, the AF motor 25 is driven in a direction to move the focusing lens group L1 toward the far side by the number of the drive pulses n (one drive pulse), and is thereupon stopped (step S123). Thereafter, the counter value of the current position CNo is decreased by one (step S125), the contrast value calculating process is performed based on image data captured by the image pickup device 11 (step S127), the peak check process is performed (step S129) and control proceeds to step S131. If the far direction switch SWf is not ON (if NO at step S119), or if the focusing lens group L1 has reached the far extremity (if YES at step S121), control skips the driving process which consists of the operations at steps S123 through S129 and proceeds to step S131.

At step S131 it is determined whether or not the MF mode has been canceled. If the MF mode has been canceled (if YES at step S131), control returns. If the MF mode has not been canceled (if NO at step S131), an MF assist process is performed (step S133) and it is determined whether or not a release switch SWR (see FIG. 1) is ON (step S135). If the release switch SWR is OFF (if NO at step S135), control returns to step S107 to repeat the operations at steps S107 through S135. If the release switch SWR is ON (if YES at step S135), control returns to a main process (not shown).

[Peak Check Process]

Figure 5:
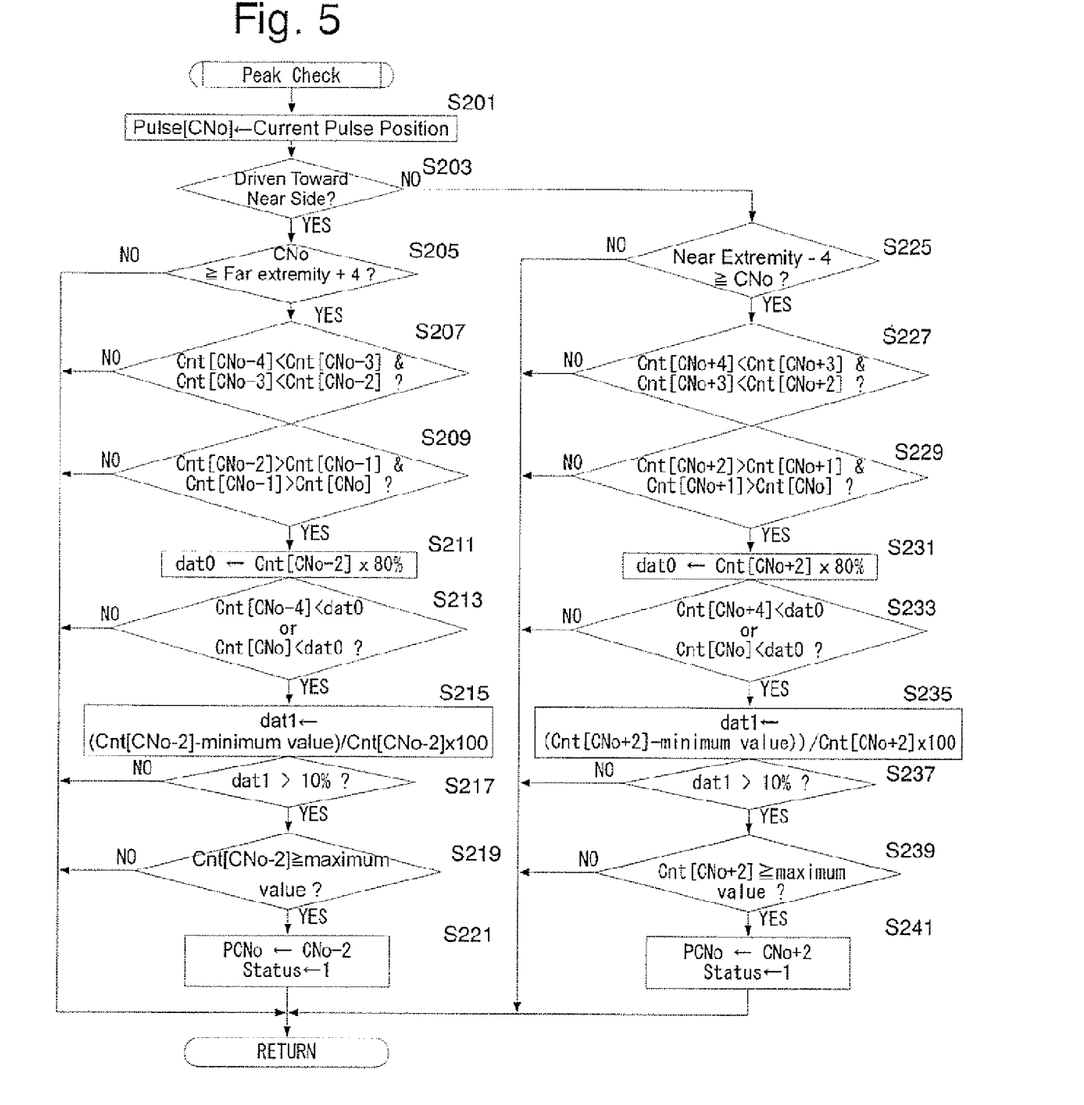
FIG. 5 is a flow chart showing a sub-routine "Peak Check Process" performed in the MF process shown in FIGS. 4A and 4B.

A peak check process which is performed at steps S117 and S129 will be hereinafter discussed in detail with reference to the flow chart shown in FIG. 5.

In the peak check process, firstly the counter value of the current position CNo is assigned to a variable pulse [CNo] (step S201). Subsequently, it is determined whether or not the focusing lens group L1 is being driven in the direction toward the near side, i.e., it is determined whether or not the near direction switch SWn is ON (step S203). Control proceeds to either step S205 or step S225 in accordance with the driving direction of the focusing lens group L1.

[Driving Focusing Lens Group Toward Near Side]

If the focusing lens group L1 is being driven in the direction toward the near side (if YES at step S203), namely, it the near direction switch SWn is ON, control proceeds to step S205 to perform operations at steps S205 through S221.

Firstly, it is determined at step S205 whether or not the counter value of the current position CNo is equal to or greater than the counter value of the far extremity of the focusing lens group L1 to which four is added (the counter value of the current position CNo+4). This operation at step S205 is performed because five contrast values at consecutive five lens positions of the focusing lens group L1 cannot be obtained unless an operation driving the focusing lens group L1 by one drive pulse is repeated four times from the far extremity, since the focusing lens group L1 commences driving from the far extremity. If the current position CNo is smaller than the counter value of the current position CNo at the far side of the focusing lens group L1 to which four is added (if NO at step S205), control returns.

If the current position CNo is equal to or greater than the counter value of the far side of the focusing lens group L1 to which four is added (if YES at step S205), it is determined whether or not the contrast value of the middle lens position of the five lens positions is a peak contrast value. In the present embodiment, firstly it is determined whether the contrast value increases two times consecutively from the lens position at the far extremity of the five lens positions to the middle lens position of the five lens positions in the group of consecutive five contrast values including the contrast value of the current position CNo (step S207). If the contrast value does not increase two times consecutively (if NO at step S207), control returns.

If the contrast value increases two times consecutively (if YES at step S207), it is determined whether the contrast value decreases two times consecutively from the middle lens position to the current lens position (the lens position at the short-distance side end of the five lens positions) of the focusing lens group L1 in the group of consecutive five contrast values including the contrast value of the current position CNo (step S209). If the contrast value does not decrease two times consecutively (if NO at step S209), control returns. If the contrast value decreases two times consecutively (if YES at step S209), 80 percent of the contrast value (Cnt[CNo−2]) of the middle lens position is assigned to a first threshold value dat0 (step S211).

Subsequently, it is determined whether or not the contrast value of the first threshold value dat0 is greater than the contrast value Cnt[CNo−4] at the lens position at the far extremity of the five lens positions, or it is determined whether or not the contrast value of the first threshold value dat0 is greater than the contrast value Cnt[CNo] at the current lens position (the lens position at the near extremity of the five lens positions) of the focusing lens group L1 (step S213). If the contrast value of the first threshold value dat0 is not greater than the contrast value Cnt[CNo−4] and the contrast value of the first threshold value dat0 is not greater than the contrast value Cnt[CNo] (if NO at step S213), control returns.

If either the contrast value of the first threshold value dat0 is greater than the contrast value Cnt[CNo−4] or the contrast value of the first threshold value dat0 is greater than the contrast value Cnt[CNo] (if YES at step S213), the contrast value of the difference between the peak contrast value (the contrast value (Cnt[CNo−2])) and a minimum value which is divided by the peak contrast value (the contrast value (Cnt[CNo−2])) and multiplied by 100 is assigned as a percentage to a second threshold value dat1 (step S215). The aforementioned minimum value is the minimum contrast value among the contrast values which have been detected and stored by the time control enters the peak check process. Thereafter, it is determined whether the second threshold value dat1 is greater than 10 percent of the minimum value (step S217). If the second threshold value dat1 is not greater than 10 percent of the minimum value (if NO at step S217), control returns.

If the second threshold value dat1 is greater than 10 percent of the minimum value (if YES at step S217), it is determined whether or not the peak contrast value (the contrast value (Cnt[CNo−2])) is equal to or greater than a maximum value (step S219). This maximum value is the maximum contrast value among the contrast values which have been detected and stored before control enters the peak check process. If the peak contrast value is not equal to or greater than the maximum value (if NO at step S219), control returns.

If the peak contrast value is equal to or greater than the maximum value (if YES at step S219), the current position CNo−2 is assigned to the peak position PCNo while the peak status flag STATUS is set to "1" (step S221), and control returns.

[Driving Focusing Lens Group Toward Far Side]

If the focusing lens group L1 is not being driven in the direction toward the near side (if NO at step S203), namely, if the far direction switch SWf is ON, control proceeds to step S225 to perform operations at steps S225 through S241.

Firstly, it is determined at step S225 whether or not the counter value of the current position CNo is equal to or smaller than the counter value of the near extremity of the focusing lens group L1 from which four is subtracted (the counter value of the current position CNo−4). This operation at step S225 is performed because a peak contrast value cannot be detected without five contrast values at consecutive five lens positions of the focusing lens group L1. If the current position CNo is not equal to or smaller than the counter value of the current position CNo at the near extremity of the focusing lens group L1 from which four is subtracted (if NO at step S225), control returns.

If the current position CNo is equal to or smaller than the counter value of the near extremity of the focusing lens group L1 from which four is subtracted (if YES at step S225), it is determined whether or not the contrast value of the middle lens position of the five lens positions is a peak contrast value. In the present embodiment, firstly it is determined whether the contrast value increases two times consecutively from the lens position at the near extremity of the five lens positions to the middle lens position of the five lens positions in the group of consecutive five contrast values including the contrast value of the current position CNo (step S227). If the contrast value does not increase two times consecutively (if NO at step S227), control returns.

If the contrast value increases two times consecutively (if YES at step S227), it is determined whether the contrast value decreases two times consecutively from the middle lens position to the current lens position (the lens position at the far extremity of the five lens positions) of the focusing lens group L1 in the group of consecutive five contrast values including the contrast value of the current position CNo (step S229). If the contrast value does not decrease two times consecutively (if NO at step S229), control returns. If the contrast value decreases two times consecutively (if YES at step S229), 80 percent of the contrast value (Cnt[CNo+2]) of the middle lens position is assigned to a first threshold value dat0 (step S231).

Subsequently, it is determined whether or not the contrast value of the first threshold value dat0 is greater than the contrast value Cnt[CNo+4] at the lens position at the short-distance side end of the five lens positions, or it is determined whether or not the contrast value of the first threshold value dat0 is greater than the contrast value Cnt[CNo] at the current lens position (the lens position at the far extremity of the five lens positions) of the focusing lens group L1 (step S233). If the contrast value of the first threshold value dat0 is not greater than the contrast value Cnt[CNo+4] and the contrast value of the first threshold value dat0 is not greater than the contrast value Cnt[CNo] (if NO at step S233), control returns.

If either the contrast value of the first threshold value dat0 is greater than the contrast value Cnt[CNo+4] or the contrast value of the first threshold value dat0 is greater than the contrast value Cnt[CNo] (if YES at step S233), the contrast value of the difference between the peak contrast value (the contrast value (Cnt[CNo+2])) and a minimum value which is divided by the peak contrast value (the contrast value (Cnt

[CNo+2])) and multiplied by 100 is assigned as a percentage to a second threshold value dat1 (step S235). The aforementioned minimum value is the minimum contrast value among the contrast values which have been detected and stored before control enters the peak check process. Thereafter, it is determined whether the second threshold value dat1 is greater than 10 percent of the minimum value (step S237). If the second threshold value dat1 is not greater than 10 percent of the minimum value (if NO at step S237), control returns.

If the second threshold value dat1 is greater than 10 percent of the minimum value (if YES at step S237), it is determined whether or not the peak contrast value (the contrast value (Cnt[CNo+2])) is equal to or greater than a maximum value (step S239). This maximum value is the maximum contrast value among the contrast values which have been detected and stored before control enters the peak check process. If the peak contrast value is not equal to or greater than the maximum value (if NO at step S239), control returns.

If the peak contrast value is equal to or greater than the maximum value (it YES at step S239), the current position CNo+2 is assigned to the peak position PCNo while the peak status flag STATUS is set to "1" (step S241), and control returns.

[MF Assist Process]

Figure 6:
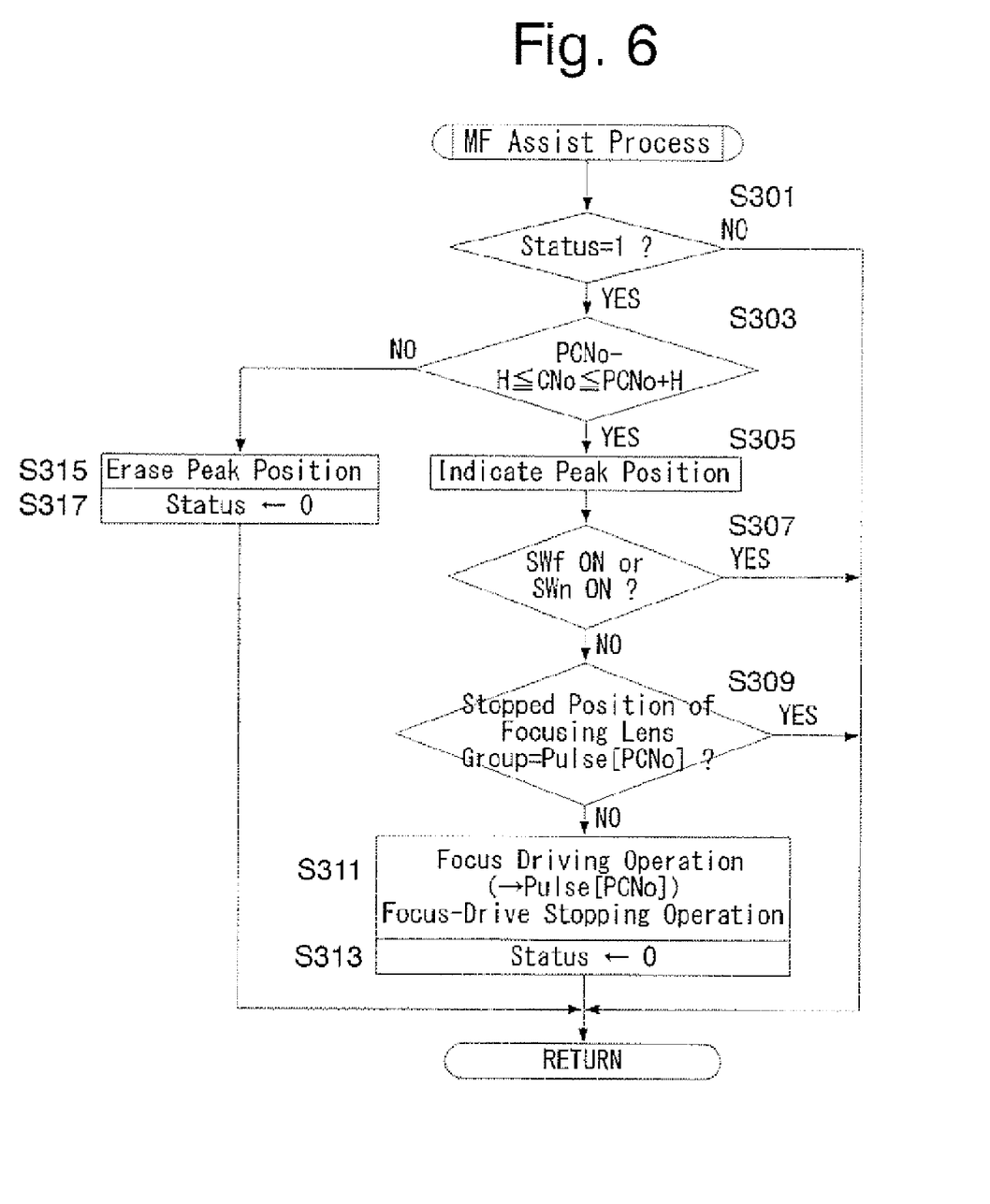
FIG. 6 is a flow chart showing a sub-routine "MF Assist Process" performed in the MF process shown in FIG. 4.
Figure 7A:
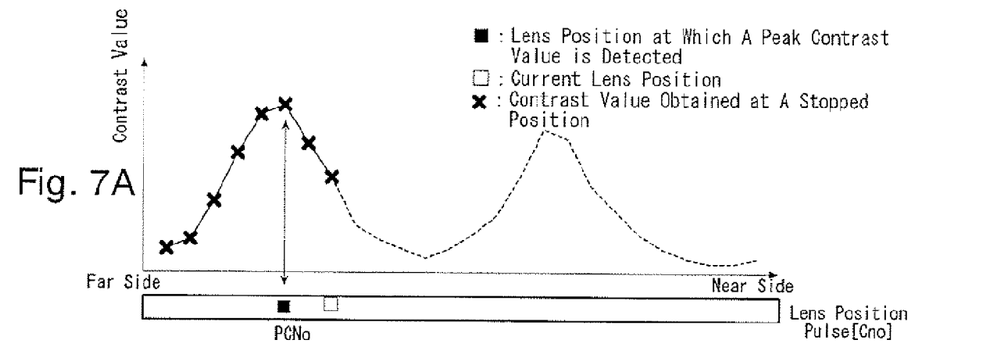
FIGS. 7A through 7D are graphs indicating a relationship between the position of the focusing lens group of the digital camera and contrast values obtained in the MF process shown in FIGS. 4A and 4B, wherein the relationship changes over time from FIG. 7A to FIG. 7D.
Figure 7B:
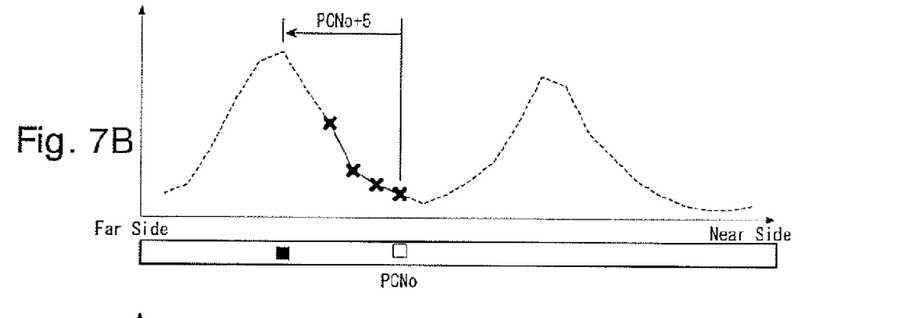
Figure 7C:
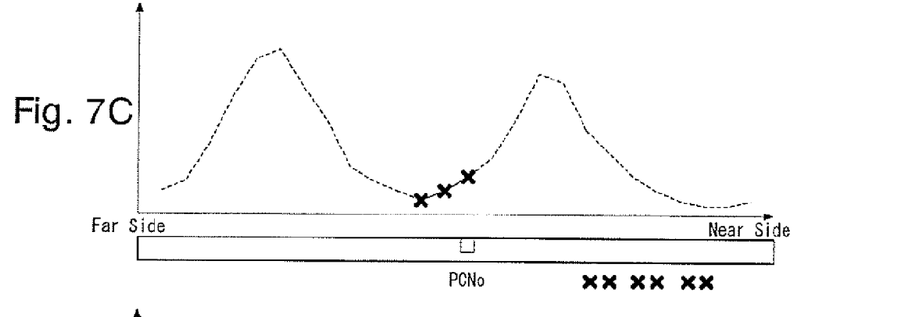
Figure 7D:
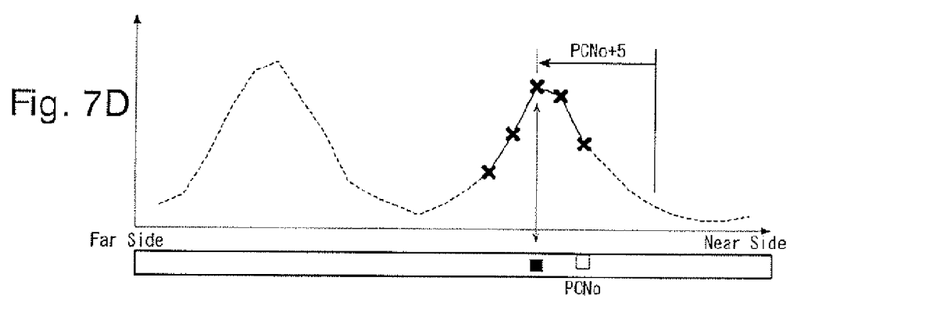

The MF assist process that is performed at step S133 will be hereinafter discussed with reference to the flow chart shown in FIGS. 6 and 7. In the present embodiment, when the photographer moves the focusing lens group L1 by operating the MF switch SWMF (the near direction switch SWn or the far direction switch SWf) and subsequently releases the MF switch SWMF to stop moving the focusing lens group L1 in the MF focus mode immediately after the photographer determines that the focusing lens group L1 has moved to an in-focus position thereof and if a deviation exists between the stopped position of the focusing lens group L1 and the lens position (in-focus position) of the focusing lens L1 at which a peak contrast value is obtained by the contrast AF process, the focusing lens group L1 is moved to the lens position thereof at which a peak contrast value is obtained, i.e., to the peak position PCNo set by the operation at step S221 or S241 if the amount of the aforementioned deviation is within a predetermined range.

In FIGS. 7A through 7D, the horizontal axis and the vertical axis represent the lens position of the focusing lens group L1 and the contrast value, respectively, and the plotted "X" marks represent contrast values which are respectively obtained at stopped positions of the focusing lens group L1. Additionally, in FIGS. 7A through 7D, square marks shown below the horizontal axis represent lens positions; more specifically, an open (hollow) square mark represents the current position CNo of the focusing lens group L1 and a black (solid filled) square mark represents the peak position PCNo of the focusing lens group L1 at which a peak contrast value is detected.

In the MF assist process, firstly it is determined whether the peak status flag STATUS is "1" (step S301). If the peak status flag STATUS is not "1" (if NO at step S301), control returns. If the peak status flag STATUS is "1" (if YES at step S301), control performs the following operations which starts from step S303.

At step S303 it is determined whether or not the peak position PCNo is within a predetermined range, i.e., within a range (effective assist range) for indicating the peak position. In the present embodiment, it is determined whether the current position CNo is positioned within a predetermined range H from the peak position PCNo in front of or behind the peak position PCNo. In the graphs shown in FIGS. 7A through 7D, the predetermined range H corresponds to five steps of the focusing lens group L1. In other words, in the illustrated embodiment, if a contrast peak does not exist within five steps of the focusing lens group 11, it is determined that the user has intentionally determined an in-focus position via a manual operation. If the current position CNo is not positioned within the predetermined range H (if NO at step S303), the peak position PCNo is erased (step S315), the peak status flag STATUS is cleared (set to "0") (step S317), and control returns.

If the current position CNo is positioned within the predetermined range H from the peak position PCNo (if YES at step S303), the peak position PCNo is indicated on a display (S305) and it is determined whether or not either the far direction switch SWf or the near direction switch SWn is ON (step S307). If either of these two switches SWf and SWn is ON (if YES at step S307), control returns. The peak position PCNo can be indicated, e.g., on the LCD monitor 17 in a manner such that a photographing distance scale is indicated vertically or horizontally and that the aforementioned open square mark (which represents the current position CNo of the focusing lens group L1) and the aforementioned black square mark (represents the peak position PCNo of the focusing lens group L1 at which a peak contrast value is detected) are indicated on the photographing distance scale (see FIGS. 7A through 7D).

If neither the far direction switch SWf nor the near direction switch SWn is ON (if NO at step S307), it is determined whether or not the stopped position of the focusing lens group L1 coincides with the peak position PCNo (step S309). If the stopped position of the focusing lens group L1 does not coincide with the peak position PCNo (if NO at step S309), the AF motor 25 is driven to make the current position CNo coincide with the peak position PCNo (step S311, the peak status flag STATUS is cleared (set to "0"), and control returns (step S313).

According to the above described MF assist process, if the focusing lens group L1 is not stopped precisely at a peak position (in-focus position), but stopped in close vicinity thereof by an operation of the MF switch SWMF when the digital camera is in the MF mode, the focusing lens group L1 is automatically moved to the peak position, which makes it possible to achieve focus at the peak position with precision. Moreover, since the present embodiment of the digital camera visually indicates the current lens position and the peak position (in-focus position), the photographer can also operate the camera while viewing such an indication.

Although an in-focus position is visually indicated and the MF assist process (an operation driving the AF motor 25 to make the current position CNo coincide with the peak position PCNo) is performed in the case where the difference between the current lens position CNo and the peak position PCNo is within the predetermined range H that is set to be five stepwise driving steps, such a predetermined range can be freely determined. For instance, the predetermined range can be changed between the far extremity and the near extremity, and an in-focus position can be indicated regardless of the lens position.

As an alternative embodiment, it is possible that a peak position at which a peak contrast value is obtained be detected in each of a plurality of focus detection ranges and that the peak position which is closest to either the current lens position or the near extremity be selected as an in-focus position.

Furthermore, the present invention can be applied to a camera provided with a conventional phase-difference detector AF sensor 31 or a conventional active distance sensor 33

(see FIG. 1). In a camera having the phase-difference detector AF sensor 31, it is determined whether or not to move the focusing lens group L1 based on the difference between the stopped position of the focusing lens group L1 upon completion of a manual AF operation and the defocus amount or distance from the object detected by phase-difference AF sensor 31. Alternatively, in a camera having the active distance sensor 33, it is determined whether or not to move the focusing lens group L1 based on the difference between the stopped position of the focusing lens group L1 upon completion of a manual AF operation and the distance from the object detected by the active distance sensor 33.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A focus adjustment apparatus comprising:
    an imaging device which captures object images via a photographing lens;
    a lens driving device which moves a focusing lens group included in said photographing lens along an optical axis thereof;
    a manual focus adjustment device which actuates said lens driving device to move said focusing lens group in response to a manual operation;
    a focus detection device which causes said imaging device to capture an object image to determine a contrast value thereof each time said focusing lens group moves along said optical axis by a predetermined amount of movement while said focusing lens group is moved via said lens driving device due to said manual operation, and which detects an in-focus position of said focusing lens group in accordance with contrast values detected by said focus detection device at different lens positions on said optical axis of said focusing lens group; and
    a controller which moves said focusing lens group to said in-focus position via said lens driving device if a deviation exists between a stopped position of said focusing lens group and said in-focus position when said focusing lens group stops moving in response to a release of said manual operation.

2. The focus adjustment apparatus according to claim 1, wherein said controller does not move said focusing lens group if a deviation does not exist within a predetermined range between a stopped position of said focusing lens group and said in-focus position.

3. The focus adjustment apparatus according to claim 1, wherein said controller does not move said focusing lens group if a deviation exists within a predetermined range between a stopped position of said focusing lens group and said in-focus position.

4. The focus adjustment apparatus according to claim 1, wherein said focus detection device detects a peak contrast value from among contrast values obtained at consecutive said lens positions of said focusing lens group in a same direction of movement thereof to determine that a lens position of said focusing lens group, at which said peak contrast value is obtained, corresponds to said in-focus position of said focusing lens group.

5. The focus adjustment apparatus according to claim 1, further comprising a display device which indicates a current lens position of said focusing lens group in said optical axis direction and said in-focus position that is detected by said focus detection device.

6. The focus adjustment apparatus according to claim 5, wherein said display device indicates said current lens position and said in-focus position only when said in-focus position is positioned within a predetermined range from said current position.

7. The focus adjustment apparatus according to claim 1, wherein said lens driving device drives said focusing lens group stepwise in steps of a predetermined amount of movement when said manual focus adjustment device actuates said lens driving device to move said focusing lens group in response to said manual operation.

8. The focus adjustment apparatus according to claim 1, wherein a peak contrast value that is detected by said focus detection device is designated as a peak contrast value which consecutively increases a plurality of times and thereafter consecutively decreases a plurality of times along a direction of movement of said focusing lens group.

9. The focus adjustment apparatus according to claim 1, wherein said contrast values are measured via said imaging device.

10. The focus adjustment apparatus according to claim 1, wherein said lens driving device comprises a lens drive mechanism and a motor that moves said focusing lens group via said lens drive mechanism.

11. The focus adjustment apparatus according to claim 10, wherein said motor comprises a stepping motor.

12. The focus adjustment apparatus according to claim 1, wherein said focus adjustment apparatus is incorporated in a digital camera.

13. A focus adjustment apparatus comprising:
    a lens driving device which moves a focusing lens group included in a photographing lens along an optical axis thereof;
    a manual focus adjustment device which actuates said lens driving device to move said focusing lens group in response to a manual operation;
    a focus detection device which detects an in-focus position with respect to an object when said focusing lens group is stopped; and
    a controller which moves said focusing lens group to said in-focus position via said lens driving device if a deviation exists between a stopped position of said focusing lens group and said in-focus position when said focusing lens group stops moving in response to a release of said manual operation.

* * * * *